April 8, 1930. W. F. HAHNEMAN 1,753,860
APPARATUS FOR PRODUCING CANALS OR THE LIKE
Filed April 28, 1928
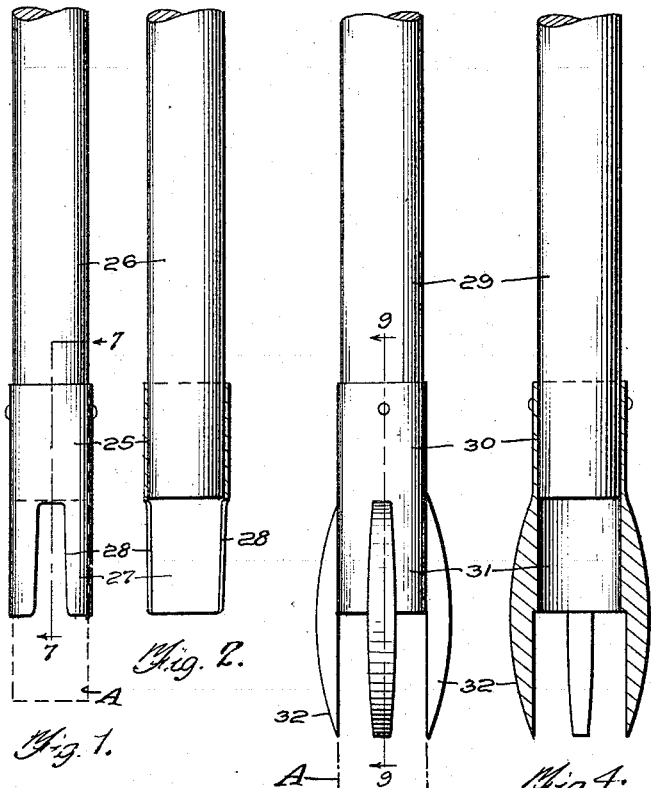
INVENTOR.
WILLIAM F. HAHNEMAN,
BY
ATTORNEY.

Patented Apr. 8, 1930

1,753,860

UNITED STATES PATENT OFFICE

WILLIAM F. HAHNEMAN, OF PUERTO CORTES, SPANISH HONDURAS, CENTRAL AMERICA

APPARATUS FOR PRODUCING CANALS OR THE LIKE

Application filed April 28, 1928. Serial No. 273,760.

My invention relates to an implement for introducing a primer into a hole formed in the ground for the purpose of producing canals, trenches, ditches, or the like.

Figure 1 is a side elevation of a primer introducting implement,

Figure 2 is a longitudinal section taken on the line 2—2 of Figure 1,

Figure 3 is a side elevation of a modified form of primer introducing implement, Figure 4 is a longitudinal section taken on line 4—4 of Figure 3.

Figure 5 is a bottom plan view of the implement shown in Figure 3.

In Figures 1 and 2, I have shown a primer introducing implement, comprising a cylindrical sleeve 25, rigidly mounted upon the lower end of a handle or stick 26. This sleeve is provided at its lower end with a cylindrical socket 27, to receive a primer, which will project downwardly below the same. The socket 27 is provided at diametrically opposite points with longitudinal slots 28, passing through the lower ends thereof and these slots permit of the free engagement between the earth or mud and the primer, aiding in the suction action upon the upward movement of the implement, to cause the primer to be removed from within the socket 27. This type of socket is preferably employed in a hard firm soil.

In Figures 3 to 4, inclusive, I have illustrated a modification of primer introducing implement, the same comprising a handle or stick 29, upon the lower end of which is rigidly secured a sleeve 30, projecting downwardly below the handle to produce a cylindrical socket 31, to receive and hold the primer. Formed intergral with the socket 31 are spaced longitudinally extending fingers 32, which are longitudinally curved at their outer edges, and project radially beyond the socket. These fingers serve to house and protect the primer when being inserted into the hole, but the spaces between the fingers permit of ready engagement between the earth and the primer, so that the primer will remain within the bottom of the hole when the implement is removed. This type of implement is preferably employed in a soft soil.

In the use of the implement, a hole is first formed in the ground at a suitable depth, and the primer, indicated by the letter A, is inserted in the socket of the implement. The implement is now moved downwardly into the previously formed hole until the primer is inserted in the bottom of the hole. The implement is now moved upwardly and the earth will engage with the sides of the primer throughout its entire length, due to the openings or slots in the socket, whereby the primer will be automatically removed from the socket of the implement as the implement is raised. After the primer has been introduced into the bottom of the hole it may be exploded for producing a pocket for receiving the complete explosive charge.

It is to be understood that the forms of my invention, herewith shown and described, are to be taken as preferred examples of the same, and that various changes in the shape, size and arrangement of parts, may be resorted to, without departing from the spirit of my invention or the scope of the subjoined claims.

Having thus described my invention, I claim:—

1. An implement for use in explosive engineering, comprising a handle, a socket secured to the end of the handle and adapted to receive a primer, said socket having opening or openings in its side so that the earth may engage with the primer and remove the same from the socket when the socket is being removed from the hole.

2. An implement for inserting the primer into a hole formed in the ground, comprising a handle, and a socket secured to the end of the handle and embodying spaced members providing openings between them so that the earth may engage the primer and remove it from the socket when the socket is withdrawn from the opening.

3. An implement for inserting a primer into a hole formed in the ground, comprising a handle, a socket secured to the end of the handle to receive the primer, said socket having fingers projecting forwardly beyond in spaced relation.

4. An implement for inserting a primer into a hole formed in the ground, comprising a handle, and a socket secured to the end of the handle to receive the primer, and laterally spaced fingers secured to the socket and extending longitudinally thereof and projecting forwardly beyond the socket, said fingers extending radially beyond the socket.

5. An implement for forming a hole in the ground having a tapered bottom, comprising a handle and a tapered head; in combination with a device for introducing a primer into the tapered bottom of the hole, comprising a handle and a socket secured to the handle, said socket having openings in its side so that the earth at the tapered bottom is forced through the openings to frictionally engage with the primer and remove the same from the socket when it is moved upwardly.

In testimony whereof I affix my signature.

WILLIAM F. HAHNEMAN.